United States Patent [19]
Murakami

[11] 3,803,564
[45] Apr. 9, 1974

[54] MULTIMATCH PROCESSING SYSTEM WITH CYLINDRICAL MAGNETIC DOMAIN ELEMENTS

[75] Inventor: Hiroshi Murakami, Tokyo, Japan

[73] Assignee: Nippon Electric Company, Limited, Tokyo-to, Japan

[22] Filed: Feb. 27, 1973

[21] Appl. No.: 336,108

[30] Foreign Application Priority Data

Mar. 8, 1972 Japan ................................ 47-24314

[52] U.S. Cl.. 340/174 GA, 340/174 TF, 307/88 LC
[51] Int. Cl. ......................... G11c 15/00, G11c 11/14
[58] Field of Search ............... 340/174 TF, 174 GA; 307/88 LC

[56] References Cited

UNITED STATES PATENTS

| | | | |
|---|---|---|---|
| 3,678,287 | 7/1972 | Chow | 340/174 GA |
| 3,760,390 | 9/1973 | Murakami | 340/174 TF |

*Primary Examiner*—James W. Moffitt
*Attorney, Agent, or Firm*—Sughrue, Rothwell, Mion, Zinn & Macpeak

[57] ABSTRACT

A multimatch processor for an associative memory consisting of bubble domain circuits. A bubble compressor consisting of a plurality of bubble idlers positioned adjacent to one another is filled with domains except for specified positions corresponding to an input word. An input word, representing the matches of an associative memory search, is entered into the specified positions. The input word is successively compressed by forcing a bubble, one each compression step, into the specified position which is (1) unfilled, and (2) nearest one end of the compressor. Compression is accomplished by having a bubble generator transfer a bubble to one end of the compressor, thereby causing all bubbles between the generator and the nearest unfilled position to move by one position. Each successive compressed word differs from the preceding word in only one bit position - the bit position filled by the latest step of compression. Each successive compressed word is compared in a bubble domain Exclusive — OR circuit resulting in a single output. The successive outputs represent the bits of the original word that designate word matches from the associative memory search.

4 Claims, 8 Drawing Figures

MULTIMATCH PROCESSING SYSTEM WITH CYLINDRICAL MAGNETIC DOMAIN ELEMENTS

BACKGROUND OF THE INVENTION

This invention relates to a multimatch processing system for use in an associative memory apparatus employing cylindrical magnetic domain elements (hereunder referred to as bubble domain elements).

An associative memory apparatus is distinguished from other memory devices depending on the designation of location addresses since each memory word in the associative memory apparatus is accessed by the contents of memory words. We can find the application of the associative memory in the fields of file maintenance, pattern recognition and information retrieval systems.

In response to a search operation, a match or mismatch signal for each stored memory word in the associative memory is obtained and stored in a response memory unit. If there are many memory words with tag fields matching a search word, it is necessary to read out the match words, one by one, according to a certain criterion.

As bubble domain elements function as memory and logic elements concurrently, the associative memory apparatus using the elements can be made simple in construction.

One such proposal has been made, for example, in the copending U.S. Pat. application No. 251,662, (inventor: Hiroshi Murakami), filed on May 9, 1972 and assigned to the same assignee as the present application.

The advantages of using the bubble domain elements, however, will be greatly decreased, if a multimatch processing system using these elements for a number of match memory words becomes complicated in construction.

Such a multimatch processing system with bubble domain elements has not been proposed.

The intention of introducing the multimatch processing system only with semiconductor circuits into the associative memory apparatus using the bubble domain elements unavoidably requires expensive converters for converting the presence and absence of domains representing match and mismatch signals into electrical signals and for converting electrical signals multimatch processed in the semiconductor circuits into the presence and absence of domains.

Even if the converters were made at lower cost, the semiconductor multimatch processing system itself is very costly to manufacture as compared with the system with the bubble domain elements.

One of the prior art multimatch processing systems employing such semiconductor circuits, in particular priority gates is described in the "PROCEEDINGS - SPRING JOINT COMPUTER CONFERENCE," 1963, pp. 381 – 394. Also, another prior art system using such semiconductor circuits, particularly, match signal distributing means is described in the U.S. Pat. No. 3,568,159 issued on March 1971.

It is, therefore, one object of the present invention to provide a multimatch processing system using the bubble domain elements capable of performing high-speed operations with simple structure and free from the above-mentioned disadvantages of the prior art systems.

SUMMARY OF THE INVENTION

The multimatch processing system of this invention comprises: a sheet of magnetic material capable of holding and moving bubble domains; means for generating a magnetic field rotating in the plane of the sheet so as to propagate the bubble domains in succession; means for applying a biasing magnetic field substantially normal to the plane of the sheet in order to keep the bubble domains at a predetermined size; a compressor circuit capable of setting an identifying word in a plurality of domain positions and controlling the word so as to be compressed by one step; an Exclusive – OR circuit capable of performing logic operations with respect to each binary representation of the identifying word compressed by ($n$-1) steps and the word compressed by $n$ steps as input; means for sequentially setting each binary representation of the word compressed by the ($n$-1) steps and the word compressed by the $n$ steps ($n = 1, 2, 3, \ldots$) into the input positions of each logic unit of the Exclusive – OR circuit.

A description of general characteristics of the bubble domain elements is given in a paper "THE BELL SYSTEM TECHNICAL JOURNAL," pp. 1901 – 1925, Oct. issue, 1967 (Reference 1). Moreover, the application of the bubble domain elements to logics or memories is shown in the article "IEEE TRANSACTIONS ON MAGNETICS," VOL. MAG-5, pp. 544 – 553, September issue, 1969 (Reference 2).

BRIEF DESCRIPTION OF THE DRAWINGS

The present invention will now be described more in detail in conjunction with the accompanying drawings, wherein.

DETAILED DESCRIPTION OF THE INVENTION

Figure 1A:
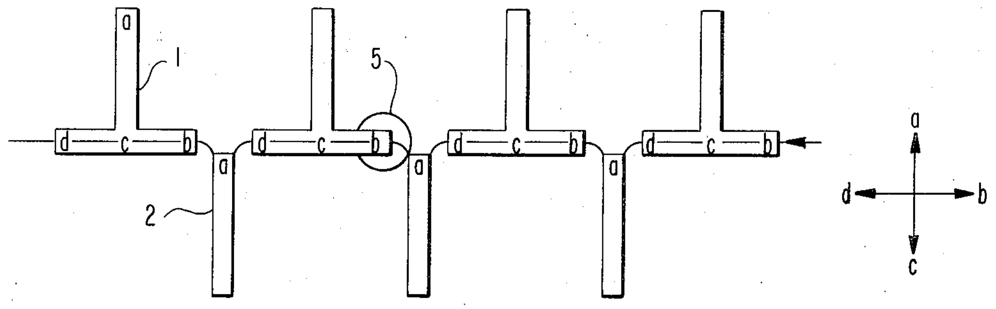
FIGS. 1A and 1B show diagrams of the well known bubble domain propagation arrangement for explaining some rules of illustration which are applied throughout the instant specification and drawings.
Figure 1B:
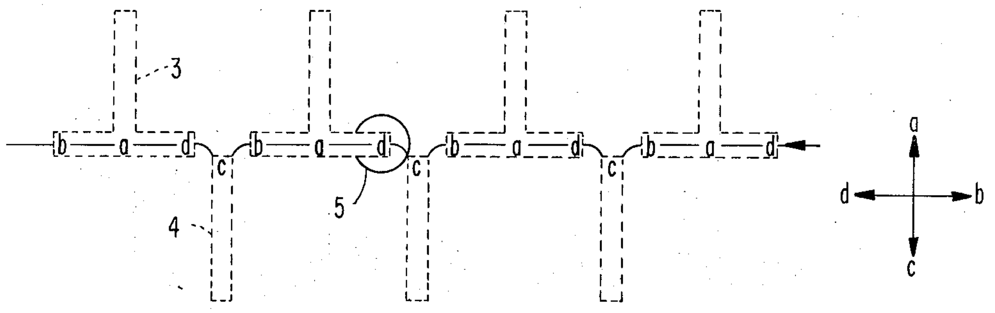

Some rules of illustration applied throughout this specification are given here before entering into detailed description of this invention. FIGS. 1A and 1B show a plane view of the surface of a sheet of magnetic material (bubble domain sheet) such as of orthoferrites in which bubble domains can be held and moved.

It is assumed here, that a plurality of ferromagnetic material pieces for defining a propagating channel for the bubble domains are disposed on the top surface of the sheet as indicated in the solid line in FIG. 1A, whereas on the rear surface as indicated in dashed line in FIG. 1B. A biasing magnetic field is applied substantially normal to the plane of the sheet, in other words, in the direction from the lower surface of the paper of the drawing to the upper surface. Therefore, the direction of magnetization of the bubble domains is in the direction from the upper surface of the paper to the lower surface. The symbols shown by the arrows at the right-hand portion indicate the directions of a rotating magnetic field applied parallel with the plane of the sheet. It is assumed that the magnetic field rotates in the order of *a*, *b*, *c*, *d*, . . . in succession. Although the following description is given to FIG. 1A, parenthesized numerals or symbols are for FIG. 1B. At a time point where the rotating magnetic field is in the direction of the arrow *a*, a magnetic pole N (S) exists at the position *a* of a ferromagnetic material piece 1 (3). At the time points where the rotating magnetic field is in the directions *b*, *c*, and *d*, the magnetic poles N (S) exist at the positions *b*, *c*, and *d* of the piece 1 (3), respectively. When the rotating magnetic field in the directions *a* and *c* is applied to a piece 2 (4), poles N (S) exist respectively at the positions *a* and *c* of the piece 2 (4). In case where the rotating magnetic field is in the directions *b* and *d*, almost no magnetic pole is produced the piece 2 (4). In general, when the longitudinal direction of the piece coincides with the direction of the rotating magnetic field, the magnetic pole N (S) is produced at one end of the piece and the pole S (N) at the other end.

In FIGS. 1A and 1B, the plane view of a bubble domain 5 is viewed. Since a magnetic field generated by the pole N(S) of the piece coincides with the direction of magnetization of the bubble domain 5, the domain 5 stays in the vicinity of the magnetic pole N (S). Accordingly, as the magnetic field rotates sequentially in the directions *a*, *b*, *c*, and *d*, the bubble domain 5 is propagated along the positions *a*, *b*, *c*, and *d* of the pieces regardless of whether the ferromagnetic material pieces are placed on the upper or the lower surface of the sheet.

Figure 2:
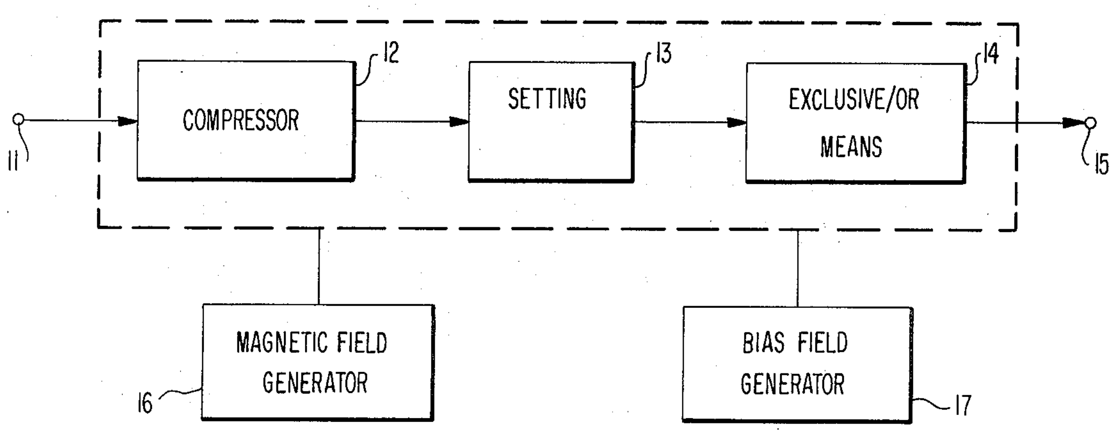
FIG. 2 shows a schematic block diagram of the multimatch processing system of this invention.

FIG. 2 shows a block diagram of the multimatch processing system of the present invention. The input to the system is an identifying word. The identifying word is generated in known manner as a result of an associative memory comparison search. The number of bits in the word equals the number of searched memory words. Each bit represents a match or a mismatch between one searched word and the searching word as is well known in the art. In the embodiment described herein a binary 0 is represented by the absence of a bubble domain, and a binary 0 in any bit position of the identifying word represents a match. If there are *n* binary zeros, then *n* searched words were matched. The multi-processor operates to sequentially generate an output at a respective output location for each binary zero of the identifying word. As is well known in multiprocessors, the successive outputs may be used to cause successive read-out of the matched memory words. The multi-processor described herein comprises only bubble domain circuits.

The identifying word is applied at input 11 to a compressor circuit 12. The circuit 12 operates to successively add a bubble to bit positions of the identifying word which were previously unfilled. Each successive bubble addition is referred to herein as a single compression step for reasons which will become apparent hereinafter. The number of compression steps needed to provide the outputs, one for each zero bit of the original identifying word, is equal to the number of zero bits in the identifying word. As will be appreciated, the identifying word in the compressor becomes successively, the identifying word compressed by one step, the identifying word compressed by two steps, and so forth until sufficient steps have been accomplished to result in the identifying word compressed by *n* steps, where *n* is the number of zeros in the original identifying word. The identifying word compressed by *n* steps will always be a word of all binary ones, i.e., a bubble in every bit location.

A setting means 13 is provided for successively setting the identifying word into input locations of an Exclusive — OR circuit 14. The Exclusive — OR circuit 14 is a bubble circuit consisting of a number of individual Exclusive — OR bubble logic gates, equal in number to the bits in said identifying word. Each Exclusive — OR gate is operatively associated with a respective bit position or bit location of the identifying word.

The basic operation may be more readily understood by consideration of an example. Although the designations binary ones and binary zeros are used in the example, it will be recognized that these designations represent the absence and presence, respectively, of bubble domains. Assume that a search of an associative memory having words 1 through 5 stored therein resulted in matches for the first, fourth, and fifth words. The identifying word will thus be 01100 (five bits for five words, and zero bits for each match). The identifying word 01100 is applied to the compressor circuit 12.

The setting means 13 sets the identifying word into the respective first input locations of the five Exclusive — OR gates. The first compression step results in the word 11100 (identifying word compressed by one step). The latter word is set into the respective second input locations of the five Exclusive — OR gates. Since the two input words differ only in the first bit position, the only output signal resulting from the Exclusive — OR operation appears at the output of the first Exclusive — OR gate. This output may be connected to cause a readout of the word No. 1 in the associative memory.

During the next step the identifying word (uncompressed) applied to the Exclusive — OR input is erased. An additional compression occurs in the compressor resulting in 11110 (identifying word compressed by two steps). The latter twice compressed word is entered into the Exclusive — OR circuit wherein it is compared with the once-compressed identifying word. This results in an output from the fourth gate which may operate to cause readout of memory word No. 4.

A further step of erasure, compression, transfer and compare will similarly result in an output from the fifth Exclusive — OR gate. Thus, summarizing, the bits of the original identifying word which are indicative of a word match cause successive output signals to appear at gates corresponding in position to the positions of said bits in the identifying word. By processing the identifying word as described, the multimatch processed output signals are obtained successively from an output unit 15 of the circuit 14. Means 16 for generating a magnetic field rotating in the plane of the thin sheet of magnetic material comprises a circuit for supplying two sets of sinusoidal currents different in phase from one another by 90° or two sets of bipolar current pulses and two sets of coils with axes orthogonally crossed. Means 17 for generating a biasing magnetic field normal to the plane of the sheet consists of a DC power supply source and a set of coils or a permanent magnet device. The thin sheet of magnetic material for maintaining the bubble domains therein is not illustrated in the drawing for simplicity.

Figure 3:
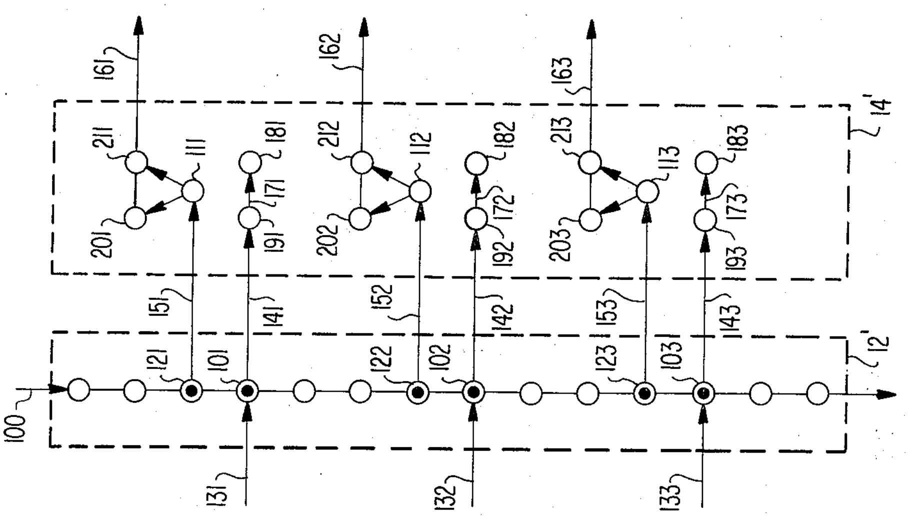
FIG. 3 shows a diagram of one embodiment of this invention.

In FIG. 3 which shows a diagram of one embodiment of this invention, the important parts of the compressor circuit 12, the Exclusive — OR circuit 14, and the means 13 for setting binary representation in the input positions of the circuit 14 are particularly shown. In the drawing, symbols indicated by the single and double circles indicate bubble domain positions performing important operations of the present multimatch processing system. The domain positions indicated by the double circle, in particular, serve also as bubble domain splitting (or dividing) positions. The solid line between any two adjacent domain positions indicates a bubble domain propagation route.

It is assumed that the propagation of the domains between the starting and terminating points of the arrow can be selectively controlled by a domain propagating means.

A dashed-line rectangle 12' includes the constituents of the compressor circuit 12 other than the means for generating bubble domains for compression, while the main constituents of a plurality of Exclusive — OR logic units are contained in the dashed-line rectangle 14'. The means 13 for setting the bubble domains in the input positions of each logic unit of the rectangle 14' comprises the transfer paths shown partly in the rectangles 12' and 14' and partly outside these rectangles. Hereinafter, the rectangles 12' and 14' are called, respectively, "a compressor part and an Exclusive — OR (or EOR) part."

Now the detailed description of operation of the embodiment of this invention will be given with reference to FIGS. 4*a* through 4*c* which illustrate how the state of each bubble domain position of FIG. 3 is changed in succession when the multimatch processing system is under operation.

Numerals in parentheses in these drawings correspond to those used in the description of the operation of FIG. 3 mentioned hereafter. Each successive rectangle represents each successive state of the bubble domains in the circuit following the successive steps carried out by the circuit. The small squares in the large rectangles of FIGS. 4*a* through 4*c* represent domain locations or positions corresponding to those shown schematically in FIG. 3. The numerals associated with rectangle (1) of FIG. 4*a* are intended to apply to the same small squares in all rectangles of FIGS. 4*a* through 4*c* but are not repeated for simplicity. The latter numerals identify the squares which represent the domain positions of FIG. 3 bearing the same numerals. It is assumed that numeral 1 in the square corresponds to the presence of a domain thereat. 1. Bubble domains from a bubble domain generating means are sequentially applied to a position 100 and distributed in each domain position of the compressor part 12' (refer to FIG. 4*a* (1)). 2. The domains in a second domain splitting unit provided in bubble domain positions 121 through 123 of the part 12' are split by a domain splitting means and the ones of the divided domains are arranged in constant domain positions 111 through 113 of each EOR logic unit contained in the part 14' via routes 151 through 153, respectively, (refer to FIG. 4*a* (*2*)). 3. The domains present in positions 101 through 103 to be occupied by each bit of the identifying word are erased by a domain erasing means (see FIG. 4*a* (3)). 4. Bubble domains corresponding to the identifying word are arranged by the domain propagating means into the positions 101 through 103 via routes 131 to 133 (refer to FIG. 4*a* (4)). In the drawing, it is assumed that each bit of the identifying word which takes binary states (010) (corresponding to match, mismatch and match) is introduced into the positions 101, 102, and 103, respectively. 5. The domains at a first domain splitting unit located in the positions 101 through 103 are split by the splitting means and the ones of the divided domains are disposed in first input domain positions 181 through 183 of each logic unit of the EOR part 14' as (010) from above via routes 141 to 143 and 171 to 173 (see FIG. 4*a* (5)). 6. One domain from a domain generating means for the part 12' is supplied through the position 100 to compress the domains present in the domain positions of the compressor part 12' by one step (refer to FIG. 4*b* (6)). 7. The domains existing in the positions 101 through 103 are split and the ones of the divided domains are arranged in second input domain positions 191 through 193 of each logic unit of the EOR part 14' as (110) (refer to FIG. 4*b* (7)). 8. Logic operations are performed in a plurality of the EOR logic units. If the information in the position 181 does not coincide with that in the position 191, the domain in the position 111 moves toward a first output domain position 201 or a second output domain position 211. The domains in the positions 112 and 113 perform the similar operation. The logic operations performed in this way are "Exclusive — OR." More definitely, each output of logic units of the EOR part 14' is 0, provided that the domains are present in the constant domain positions, whereas it is 1, provided that the domains are present in either the first or the second output domain positions. In this case, information in the position 181 is different from that in the position 191, or a domain is present in the position 191, but absent in the position 181, the domain in the position 111 leaps to the second output domain position 211 (see FIG. 4*b* (8) ). 9. Via propagating routes from the positions 201 and 211 to an output unit 161, from the positions 202 and 212 to an output unit 162, and from the positions 203 and 213 to an output unit 163, the output signals obtained by multimatch processing of the identifying word are derived from the output units 161 through 163 to an external circuit (not shown). In this operation, an output signal 1 is gained from the output unit 161. The memory word corresponding to the output signal 1 is one of the matching memory words. 10. The domains in the positions 181 through 183 are erased (refer to FIG. 4*b* (10) ). 11. The domains in the positions 191 through 193 are propagated to the positions 181 through 183 via the routes 171 to 173, respectively, (see FIG. 4*b*(11) ). 12. Then, the operations (6) through (11) are repeated. The states of the domain positions for the operations (6) through (11) corresponding to the second repetition cycle are illustrated in FIGS. 4*c* (6)' through (8)' and (10)' and (11)'. In these operations, it is understood that an output signal 1 can be obtained from the output unit 163 as indicated in FIG. 4*c* (8)'. 13. In case where any output signal 1 is not obtained from any EOR logic unit in the operation (8) during the repeated operations (6) through (11), the multimatch processing operation has accomplished. Finally, the domains present in the positions 181 through 183 and the positions 111 through 113 are erased to prepared the system for the subsequent processing.

In such a way, even if the memory words will multimatch the search word (double in this example) and the identifying word will include the match signals in the multiple bit positions (two positions in this example), they can be taken out in succession.

Figure 4A:
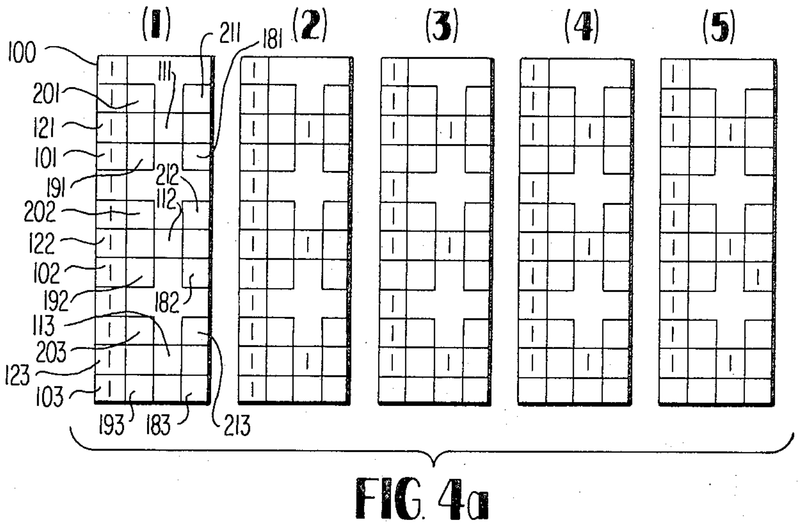
FIGS. 4*a* through 4*c* show diagrams for explaining more in detail the operation of the multimatch processing system shown in FIG. 3.
Figure 4B:
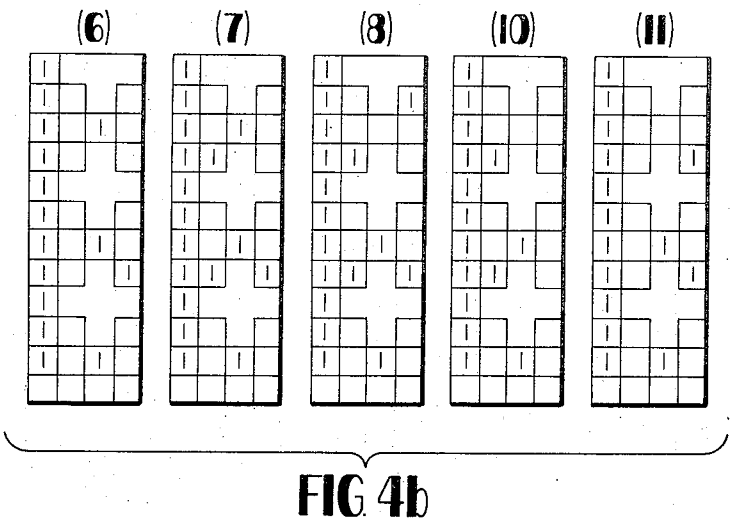
Figure 4C:
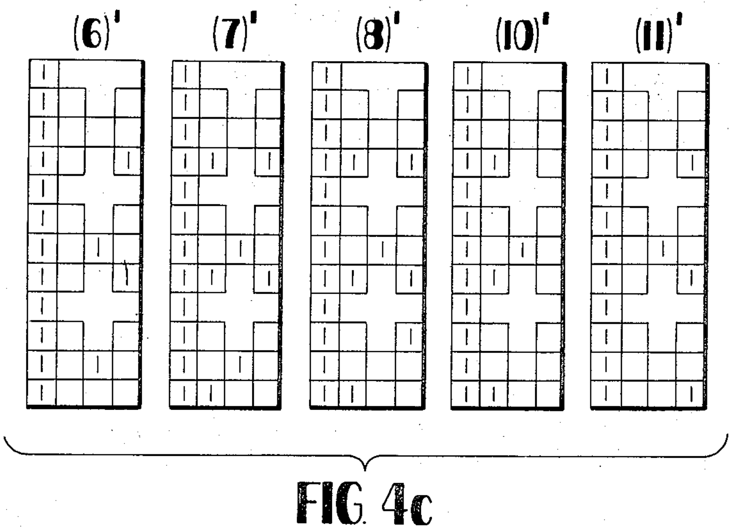

In the drawings FIGS. 4*a* through 4*c* which illustrate changes in states of the domain positions, both FIGS. 4*b* (6) and 4*c* (6)' indicate the states of the domain positions after the domains present in the compressor part 12' have been compressed by one step. By the one-step compression, one domain appears in the domain position which is allocated at the nearest to the domain input unit for compression of all unoccupied domain positions in the compressor part 12'. Thus, when the state of the domain positions shown in FIG. 4*a* (5) is compressed by one step, one domain appears in the position 101 as shown in FIG. 4*b* (6). In response to the one-step compression for the state of FIG. 4*b* (11), one domain exists in the position 103 as shown in FIG. 4*c* (6)'. The term "one-step compression" in the compressor part 12' means the above-mentioned changes in each state.

Information represented by the presence and absence of the domains after the *n*-step compression is called "information compressed by n-step".

The states of the domain positions shown in FIGS. 4*b* (7) and 4*c* (7)' illustrate those immediately before the logic operations are performed within the EOR units In FIG. 4*b* (7), uncompressed (or O-step compressed) identifying word is set as (010) from the above in the first input domain positions 181 through 183, while one-step compressed identifying word is set as (11000 from the above in the second input domain positions 191 through 193.

Likewise, in FIG. 4*c* (7)', one-step compressed word is set as (110) in the positions 181 through 183 and two-step compressed word is set as (111) from the above in the positions 191 through 193.

When the identifying word is (010), it contains two zeros each of which indicates that the corresponding memory word matches the search word. Consequently, the multimatch processing will be carried out simply by two-step compression. If the identifying word contains N number of zeros, N-step compression is required.

The description mentioned previously that (*n-1*)-step compressed identifying word and n-step compressed identifying word ($n = 1, 2, 3, \ldots$) are successively set in the input domain positions of the EOR part, may be easily understood through these operations.

As will be apparent from the foregoing, the main constituents of the present multimatch processing system using the bubble domain elements according to the embodiment of this invention are given below.

The compressor circuit 12 includes the compressor part 12' having a plurality of domain positions which contain the domain positions for the first and second domain splitting units, means for generating the domains for compression, means for erasing the domains of the first domain splitting unit formed in the domain positions 101 through 103, and means for propagating the identifying word from the input unit to the positions 101 through 103. The EOR circuit comprises a plurality of EOR logic units having the first input domain positions 181 through 183, the second input domain positions 191 through 193, the first output domain positions 201 through 203, the second output domain positions 211 through 213, and the constant domain positions 111 through 113 and so composed that, only if information in the first and second input domain positions are different from each other during operation, the domains present in the constant domain positions are propagated to either the first or the second output domain positions, means for splitting the domains in the second domain splitting unit formed in the positions 121 through 123, means for moving the domains from the positions 121 through 123 to the positions 111 through 113 and from the positions 201 through 203 and 211 through 213 to the output units 161 through 163, and means for erasing the domains existing in the positions 111 through 113. The setting means for setting the domains in the input domain positions 181 through 183 and 191 through 193 has means for dividing the domains present in the first splitting unit formed in the positions 101 through 103, means for propagating the domains from the positions 101 through 103 to the positions 191 through 193 via the domain propagating routes 141 through 143 and from the positions 191 through 193 to the positions 181 through 183 via the domain propagating routes 171 through 173, and means for erasing the domains in the positions 181 through 183.

Inasmuch as the various individual parts of the compressor circuit 12, such as the propagating means and the splitting means illustrated in FIG. 3, as well as the domain generating and erasing means not shown in figure are well known, only a brief description will be given here. The means for propagating the domains is composed of a group of conductors and current supply curcuits therefor, and as an example may consist of ferromagnetic pieces and a rotating magnetic field. This means is shown in FIGS. 10 and 13 and FIGS. 16 through 23 of Reference 2. The domain splitting means is constituted by a group of conductors and current supply circuits therefor. This splitting means is shown in FIG. 14 of Reference 2. The means for generating the domains is constructed by ferromagnetic pieces formed on a thin sheet of magnetic material capable of moving the domains, a circuit for modulating a rotating magnetic field produced in parallel with the plane of the sheet, or a group of conductors and current supply circuits therefor. The domain generating means is illustrated in FIG. 14 of Reference 2. The erasing means consists of conductors with loop section and current supply circuits for producing a magnetic field in the loop section in a direction opposite to that of magnetization of the domain.

The principle of the erasing operation will be evident from the general characteristic of the bubble domain elements disclosed in Reference 1. The compressing operation of the compressor circuit 12 is carried out by causing the domain positions (idler) composed of ferromagnetic thin film pieces to be filled with the domains and by applying the domains to the input unit. The compressor circuit 12 is shown more in detail in the article "IEEE TRANSACTIONS ON MAGNETICS," VOL. MAG-6, September issue, 1970, page 450 (Reference 3).

Figure 5:
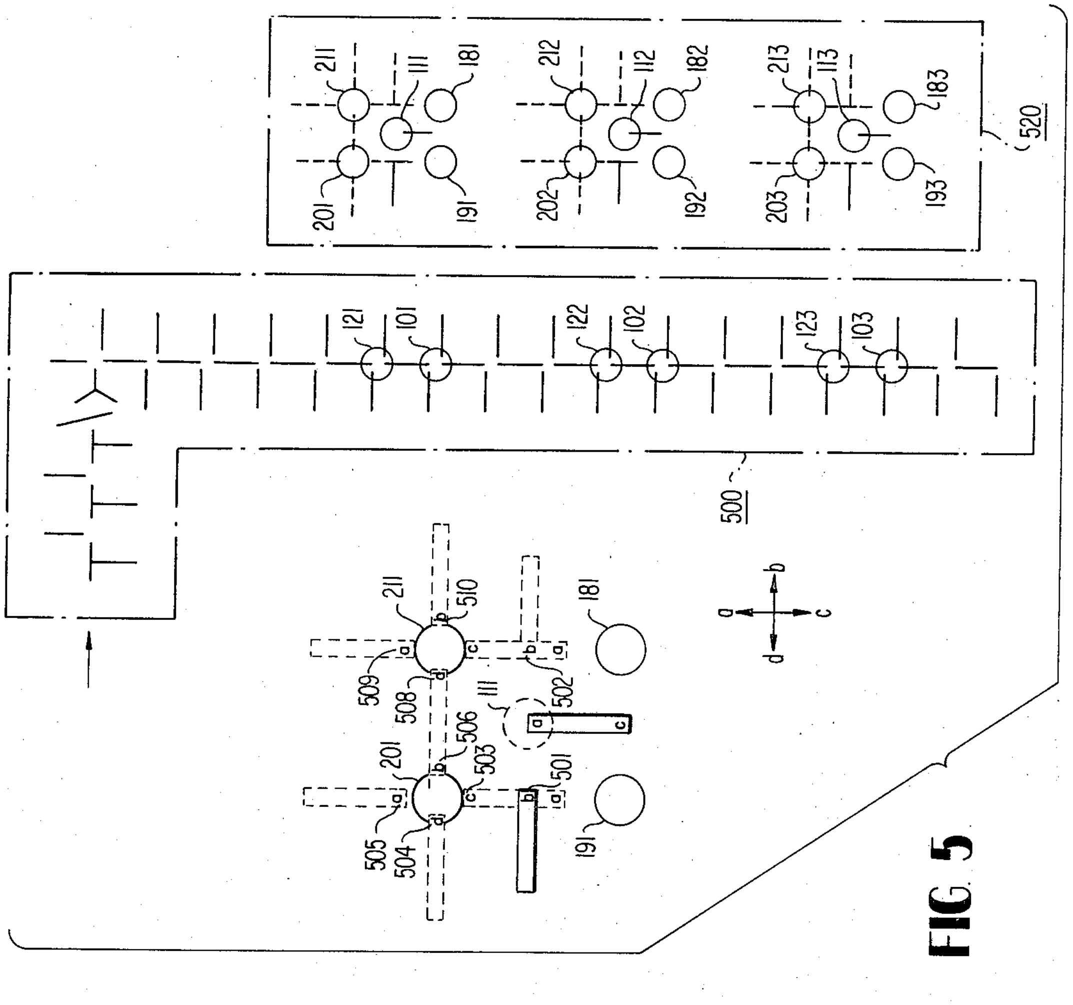
FIG. 5 shows a diagram illustrating more in detail a compressor circuit and an Exclusive – OR circuit of this invention.

FIG. 5 shows a schematic diagram of practical ferromagnetic thin film pieces for realizing the operations mentioned previously in connection with FIG. 3. Since the operations (1), (6), and (8) can be attained by the application of the rotating magnetic field, the pieces capable of moving the domains are disposed on both surfaces of the sheet so that the operations (1), (6), and (8) can be performed. The pieces shown in dashed line are disposed on the bottom surface of the sheet of magnetic material. The same numerals as those in FIG. 3 are affixed to the corresponding positions in FIG. 5. A main section 500 of the compressor circuit 12 surrounded by the dotted and dashed line has a plurality of idlers to serve as the domain positions. The first domain splitting unit and the second domain splitting unit are installed as coincided with the positions 101 through 103 and the positions 121 through 123, respectively.

A section shown in numeral 520 on the right-hand side in FIG. 5 illustrates the EOR logic units for three bits of the identifying word. A description will be given here with respect to only the uppermost logic unit. It is assumed here that the domains corresponding to information have been disposed in the position 111 and the first and second input domain positions 181 and 191. This state corresponds to the state after the completion of the previously mentioned operation (7) with reference to FIG. 3. Then, the rotating magnetic field is applied to that state. If information stored in the position 181 coincides with that stored in the position 191, the horizontal component of the resultant forces exerting on the domain present in the position 111 becomes zero, because the attractive force due to the magnetic pole of the ferromagnetic piece and the repelling forces due to the domains present in the positions 181 and 191 are balanced. Therefore, the domain present in the position 111 remains unchanged. In contrast, when information stored in the position 181 does not coincide with that in the position 191, the horizontal component of the resultant forces caused by the attracting and repelling forces exerting on the domain present in the position 111 is not zero. As a result, the domain leaps toward either the first output domain position 201 or the second output domain position 211. Thus, the Exclusive — OR operation is performed. This operation will be described more in detail with reference to an enlarged drawing of only the uppermost logic unit of the EOR logic units 520 shown at the upper right-hand portion in FIG. 5.

When the rotating magnetic field is in a direction *b*, the horizontal component force exerting on the domain in the position 111 consists of the horizontal components of the attracting forces exerted by the magnetic poles in positions 501 and 502 and the repelling forces due to the domains present in the positions 181 and 191. For the reasons, in cases where both positions 181 and 191 are occupied with the domains or unoccupied, the resultant forces in the horizontal direction exerting on the domain existing in the position 111 is zero. In contrast, where one domain is present in the position 181 and absent in the position 191, the repelling force in the left direction is caused for the domain in the position 111, enabling the domain to leap toward the left direction. In this case, the attracting force caused by the magnetic pole in the position 501 overcomes that by the magnetic pole in the position 502. Thus, the domain reaches the position 501. In a similar manner, the domain in the position 111 reaches the position 502 in the case of the presence and absence of domains in the positions 191 and 181, respectively.

As the rotating magnetic field rotates in directions *c* and *d*, in succession, the domain moved to the position 501 reaches a position 504 via a position 503. Then, even if the rotating magnetic field is continuously applied, the domain present in the position 504 is merely propagated through positions 506, 503, 504, and 505 one after another. These positions 506, 503, 504, and 505 constitute the first output domain position 201. In a similar way, the domain propagated to the position 502 reaches a position 508 via a position 507. Thereafter, the domain present in the position 508 is propagated through positions 509, 510, 507, and 508 sequentially. These positions constitute the second output domain position 211. Inasmuch as the domain in the position 111 performs such operations, the true output resulting from the EOR operation for information in the position 181 and that in the position 191 is obtained from the 1st or 2nd output position 201 or 202. Although no ferromagnetic pieces are shown for positions 181 and 191, it is necessary to maintain the domains in the latter positions. This may be accomplished by current in the conductors used for the domain propagating means during the above-mentioned logic operation or otherwise, by installing the idlers in the form of ferromagnetic pieces as indicated in Reference 3. These means are omitted from the figure for simplicity.

Although description of the multimatch processing system of this invention has been given with reference to an identifying word of 3 bits for simplicity of explanation, it will be apparent that the bit number need not be restricted to three as used for the present embodiment.

The bubble domains obtained from the output units 161 through 163 which correspond to the multimatch processed signals can be utilized for reading out data fields of the memory words matching the search word or for writing new information in the memory words. For example, the bubble domain obtained from the output unit is utilized to control the switches which are controlled by the domains and by which the readout decoder and write-in decoder as shown in the block diagram of FIG. 1 on page 221 of a paper "AIP (American Institute of Physics) Conference Proceedings", No. 5, part 1 are replaced. Depending on the operation mode of this switch, the domains from the output units may be employed after they have been split.

The operating speed of the present system is not governed by the bit number of the identifying word, but depends on the number of bits representing the matching in the identifying word.

Also, it has been assumed in the foregoing that the magnetic material for holding and moving the bubble domains therein is a single sheet, but it will be apparent that this system can be composed of more than one sheet by utilizing the interaction between the domains. In addition, the ferromagnetic pieces shown in FIG. 5 are of T- and I- shaped patterns but their geometrical shapes are by no means restricted thereto. Instead, Y shaped pattern, for instance, may be used.

The present multimatch processigg system with the bubble domain elements becomes simpler in construction and is more inexpensive to manufacture as compared with that realized by the semiconductor circuits. Moreover, the application of the present system to the associative memory system makes it possible to dispence with the converters for converting the bubble domains into the electrical signals and vice versa. As a result, the associative memory system excellent in ratio of performance to cost can be made.

It would be apparent, however, that a number of alternatives and modifications can be made within the scope of the present invention defined by the appended claims.

What is claimed is:

1. A multimatch processing system using bubble domain elements comprising:

a sheet of magnetic material capable of holding and moving domains;

means for generating a magnetic field rotating in the plane of the sheet so as to propagate the bubble domains in succession;

means for applying a biasing magnetic field substantially normal to the plane of the sheet in order to keep the bubble domains at a predetermined size;

compressor circuit means for setting an identifying word into a plurality of domain positions and for controlling the word so as to be compressed by one step at a time;

Exclusive — OR circuit means for performing Exclusive — OR logic operations on two input words applied thereto; and means for sequentially setting said identifying word after $(n - 1)$- steps of compression and after $n$ - steps of compression $(n = 1, 2, 3, \ldots)$ into the input positions of said Exclusive — OR circuit.

2. The multimatch processing system of claim 1 wherein said compressor circuit means comprises, a compressor part having a plurality of domain positions including domain positions for first and second domain splitting units, means for generating domains for compression, means for erasing domains present in the first domain splitting unit formed on a part of the plurality of domain positions, and means for propagating information represented by the presence and absence of domains from an input unit to the domain positions of the first splitting means, and wherein said Exclusive — OR circuit means comprises, a plurality of logic units, each said logic unit having first and second input domain positions, first and second output domain positions and a constant domain position all placed relative to one another to cause a domain present in said constant position to propagate toward the first or second output domain positions only when information in the both input domain positions are different from each other, said system further comprising, means for dividing domains present in the second splitting unit, means for propagating domains from said second splitting unit to the said constant domain positions and from the first and second output domain positions to output units, and means for erasing domains present in the constant domain positions; and wherein said setting means for setting information into input positions of the Exclusive — OR circuit means comprises, means for dividing domains present in the first splitting unit, means for moving domains from the first splitting unit to the second input domain positions and from the second input domain positions to the first input domain positions, and means for erasing domains existing in the first input domain positions, whereby (a) domains from domain generating means for compression are sequentially arranged at the domain positions of the compressor part, (b) the domains present in the second splitting unit of the compressor part are divided, and those ones of the divided domains are disposed at the constant domain positions, (c) the domains existing in the domain positions of the first splitting unit are erased. (d) an identifying word consisting of bit number equal to the number of memory words and represented by the presence and absence of the domains corresponding to the match and mismatch is disposed at said domain positions of the first splitting unit from input unit, (e) the domains existing in the positions of the first splitting unit are divided and arranged at the first input domain positions, (f) one domain from means for generating the domains for compression is introduced into the compressor part to compress the domains present in the compressor part by one step, (g) the domains present in the domain positions of the first splitting unit are divided and the ones of the divided domains are disposed at the second input domain positions, (h) the Exclusive — OR circuit performs the logic operations with respect to information present in the first and second input domain positions, (i) output signals are taken from the first or second output domain positions to an external circuit, (j) the domains in the first input domain positions are erased, (k) the domains in the second input domain positions are moved to the first input domain positions, (l) the operations (f) through (k) are repeated until the domains representing bit "1" as the output signals have been exhausted, and (m) finally, the domains present in the first input domain positions and the constant domain positions are erased.

3. A bubble domain multimatch processing system operative in response to an identifying word consisting of bubbles and no-bubbles representing binary values, for providing successive outputs corresponding to the information content of said identifying word, said system comprising:

a compressor means, said compressor means comprising a plurality of adjacent bubble locations, a first group of bubble eraser means associated with a first group of said bubble locations, said first group of locations being equal in number to the bits of said identifying word, a first group of bubble splitters associated with said first group of bubble locations, means for generating bubbles for entry into said compressor whereby each new bubble entered into said comressor causes the unfilled bubble location nearest the point of entry to become filled due to compression caused by repulsion between bubbles, propagation means for entering the bubbles representing the bits of said identifying word into the respective bubble location of said first group of locations, whereby the word becomes stored in said locations and becomes compressed each time another bubble enters said compressor at said point of entry, a plurality of Exclusive — OR bubble logic units each one associated, respectively, with each bubble location of said first group, each said Exclusive — OR bubble logic unit comprising, first input, second input and constant bubble locations and first and second output bubble locations, said locations being positioned relative to one another such that a non-zero repulsive force due to a bubble in only one of said first and second input locations causes a bubble in said constant location to propagate to one of said output locations, and propagation means for transferring bubbles split by said first group of splitting means to said first input locations of said Exclusive — OR units, respectively, propagation means for transferrring bubbles in said first input locations to said second input locations of the same Exclusive — OR units, and means for entering bubbles into said constant bubble locations.

4. A bubble domain multimatch-processing system as claimed in claim 3 wherein said compressor means further comprises a second group of bubble splitter means associated with a second group of compressor bubble loactions, said second group of compressor bubble locations being different from said first group of locations but being equal in number to said first group, and wherein said means for entering bubbles into said constant bubble locations comprises bubble propagation means for transferring bubbles split by said second group of bubble splitters to said constant bubble locations.

* * * * *

UNITED STATES PATENT OFFICE
CERTIFICATE OF CORRECTION

Patent No. 3,803,564 Dated April 9, 1974

Inventor(s) Hiroshi Murakami

It is certified that error appears in the above-identified patent and that said Letters Patent are hereby corrected as shown below:

In The Specification:

Column 3, line 18 - after "produced" insert -- in --

Column 7, line 29 - delete "O-step" and insert -- O-step -- (zero)
line 32 - delete "(11000" and insert -- (110) --
line 45 - delete "(n-1)" (letter) and insert -- (n-1) -- numeral Column 8, line 33 - "curcuits" should be "circuits".

Column 9, line 49 - after "For" delete "the" and insert -- these --

Column 10, line 57,- delete "processigg" and insert -- processing --

Column 12, line 2 - after "erased" delete "." and insert -- , --

Signed and sealed this 8th day of October 1974.

(SEAL)
Attest:

McCOY M. GIBSON JR.
Attesting Officer

C. MARSHALL DANN
Commissioner of Patents